United States Patent
Siklos et al.

(10) Patent No.: US 10,078,807 B2
(45) Date of Patent: Sep. 18, 2018

(54) METHODS AND SYSTEMS FOR PROVIDING A DISCUSSION THREAD TO KEY PERFORMANCE INDICATOR INFORMATION

(71) Applicant: Dundas Data Visualization, Inc., Toronto (CA)

(72) Inventors: Robert E. Siklos, Toronto (CA); Stanislav Kashepava, Toronto (CA); Troy A. Marchand, Nobleton (CA)

(73) Assignee: Dundas Data Visualization, Inc., Toronto (CA)

( * ) Notice: Subject to any disclaimer, the term of this patent is extended or adjusted under 35 U.S.C. 154(b) by 0 days.

(21) Appl. No.: 15/606,901

(22) Filed: May 26, 2017

(65) Prior Publication Data

US 2017/0330125 A1     Nov. 16, 2017

Related U.S. Application Data (63) Continuation of application No. 14/626,042, filed on Feb. 19, 2015, which is a continuation of application No. 13/082,556, filed on Apr. 8, 2011.

(Continued)

(51) Int. Cl.
    *G06F 15/16*      (2006.01)
    *G06Q 10/06*      (2012.01)
(Continued)

(52) U.S. Cl.
    CPC ..... *G06Q 10/06393* (2013.01); *G06F 3/0481* (2013.01); *G06F 17/241* (2013.01);
(Continued)

(58) Field of Classification Search
    CPC ......... G06F 17/30554; G06F 17/30277; G06F 17/30289; G06F 17/30424; G06F 17/241;
(Continued)

(56) References Cited

U.S. PATENT DOCUMENTS

| | | |
|---|---|---|
| 6,088,691 A | 7/2000 | Bhargava et al. |
| 6,289,462 B1 | 9/2001 | McNabb et al. |

(Continued)

OTHER PUBLICATIONS

Browne (IBM Cognos Business Intelligence VI0.1 Intelligence Unleashed, Oct. 12, 2010).*

(Continued)

*Primary Examiner* — Chris Parry
*Assistant Examiner* — Weiwei Stiltner
(74) *Attorney, Agent, or Firm* — Bereskin & Parr LLP/S.E.N.C.R.L., s.r.l.

(57) ABSTRACT

Systems and methods for providing a discussion thread to key performance indicator information displayed on a dashboard are disclosed. The system may include a renderer for rendering a dashboard displaying a key performance indicator value corresponding to at least one business value. The system may also include a comment module that is configured to: receive a comment corresponding to the displayed key performance indicator value, and generate a discussion thread including the received comment. The generated dashboard can then be rendered by the renderer in association with the displayed key performance indicator value. In some cases, the discussion thread can include a plurality of related comments.

13 Claims, 8 Drawing Sheets

Related U.S. Application Data (60) Provisional application No. 61/430,448, filed on Jan. 6, 2011.

(51) Int. Cl.
  *G06F 3/0481* (2013.01)
  *G06F 17/30* (2006.01)
  *G06F 17/24* (2006.01)

(52) U.S. Cl.
  CPC .. *G06F 17/30277* (2013.01); *G06F 17/30289* (2013.01); *G06F 17/30321* (2013.01); *G06F 17/30353* (2013.01); *G06F 17/30389* (2013.01); *G06F 17/30398* (2013.01); *G06F 17/30424* (2013.01); *G06F 17/30551* (2013.01); *G06F 17/30554* (2013.01); *G06Q 10/06395* (2013.01)

(58) Field of Classification Search
  CPC ......... G06F 17/30321; G06F 17/30353; G06F 17/30389; G06F 17/30398; G06F 17/30551
  USPC .................................................. 709/203–204
  See application file for complete search history.

(56) References Cited

U.S. PATENT DOCUMENTS

| | | |
|---|---|---|
| 6,448,958 B1 | 9/2002 | Muta |
| 7,114,007 B2 | 9/2006 | Sasaki |
| 7,565,683 B1 | 7/2009 | Huang et al. |
| 7,669,244 B2 | 2/2010 | Smith |
| 7,797,676 B2 | 9/2010 | Agapi et al. |
| 7,822,662 B2 | 10/2010 | Guzik et al. |
| 7,900,139 B2 | 3/2011 | Hosotsubo |
| 7,958,120 B2 | 6/2011 | Muntz et al. |
| 8,261,181 B2 | 9/2012 | Tien et al. |
| 8,392,877 B1 | 3/2013 | Chiluvuri |
| 8,423,494 B2 | 4/2013 | Barrett et al. |
| 8,429,151 B2 | 4/2013 | Nica et al. |
| 2003/0236732 A1 | 12/2003 | Cimral et al. |
| 2004/0001092 A1 | 1/2004 | Rothwein et al. |
| 2004/0133536 A1 | 7/2004 | Uceda-Sosa |
| 2004/0208370 A1 | 10/2004 | Whatmough |
| 2005/0027871 A1 | 2/2005 | Bradley et al. |
| 2005/0050315 A1 | 3/2005 | Burkhardt et al. |
| 2005/0071737 A1 | 3/2005 | Adendorff et al. |
| 2005/0091241 A1 | 4/2005 | Mills et al. |
| 2005/0216831 A1 | 9/2005 | Guzik et al. |
| 2005/0240467 A1 | 10/2005 | Eckart et al. |
| 2006/0010164 A1 | 1/2006 | Netz et al. |
| 2006/0031182 A1 | 2/2006 | Ryan et al. |
| 2006/0212791 A1 | 9/2006 | Crow et al. |
| 2006/0259629 A1 | 11/2006 | Usmani et al. |
| 2007/0088731 A1 | 4/2007 | Chant et al. |
| 2007/0106643 A1 | 5/2007 | Croft et al. |
| 2007/0180519 A1 | 8/2007 | Boccon-Gibod et al. |
| 2007/0226314 A1 | 9/2007 | Eick et al. |
| 2007/0234198 A1* | 10/2007 | Tien ...................... G06F 17/241 715/205 |
| 2007/0245238 A1 | 10/2007 | Fugitt et al. |
| 2008/0010233 A1 | 1/2008 | Sack et al. |
| 2008/0059441 A1 | 3/2008 | Gaug et al. |
| 2008/0115103 A1 | 5/2008 | Datars et al. |
| 2008/0127052 A1 | 5/2008 | Rostoker |
| 2008/0229213 A1 | 9/2008 | Hamilton et al. |
| 2008/0256439 A1 | 10/2008 | Boreham et al. |
| 2008/0256440 A1 | 10/2008 | Boreham et al. |
| 2008/0294471 A1 | 11/2008 | Gupta et al. |
| 2008/0294680 A1 | 11/2008 | Powell et al. |
| 2009/0055724 A1 | 2/2009 | Van ham et al. |
| 2009/0157447 A1 | 6/2009 | Busch |
| 2009/0187845 A1 | 7/2009 | Middelfart |
| 2009/0217150 A1* | 8/2009 | Lin ................... G06F 17/30899 715/232 |
| 2009/0265654 A1* | 10/2009 | Dieberger ......... G06F 17/30551 715/772 |
| 2010/0058466 A1 | 3/2010 | Marchand et al. |
| 2010/0100562 A1 | 4/2010 | Millsap |
| 2010/0161677 A1 | 6/2010 | Zurek et al. |
| 2010/0251129 A1 | 9/2010 | Beringer et al. |
| 2010/0313157 A1 | 12/2010 | Carlsson et al. |
| 2010/0318200 A1 | 12/2010 | Foslien et al. |
| 2011/0061013 A1 | 3/2011 | Bilicki et al. |
| 2011/0113019 A1 | 5/2011 | Leff et al. |
| 2011/0137917 A1 | 6/2011 | Boland et al. |
| 2011/0145880 A1 | 6/2011 | Wang |
| 2011/0173164 A1* | 7/2011 | Bendel .............. G06F 17/30501 707/693 |
| 2011/0173680 A1 | 7/2011 | Bates et al. |
| 2011/0210986 A1 | 9/2011 | Goutsev et al. |
| 2011/0214081 A1 | 9/2011 | Dobrin et al. |
| 2011/0246925 A1 | 10/2011 | Marchand et al. |
| 2011/0296311 A1 | 12/2011 | Dias et al. |
| 2011/0302194 A1 | 12/2011 | Gonzalez et al. |
| 2011/0314403 A1 | 12/2011 | Yan |
| 2012/0041974 A1 | 2/2012 | Bse et al. |
| 2012/0089902 A1 | 4/2012 | Sheflin |
| 2012/0166963 A1 | 6/2012 | Kohli et al. |
| 2012/0179513 A1 | 7/2012 | Siklos et al. |
| 2012/0180002 A1 | 7/2012 | Campbell et al. |
| 2012/0180108 A1 | 7/2012 | Siklos et al. |
| 2012/0249870 A1 | 10/2012 | Senster |
| 2012/0254053 A1 | 10/2012 | Joa et al. |
| 2013/0042190 A1 | 2/2013 | Ciloci |
| 2013/0212085 A1 | 8/2013 | Nica et al. |
| 2014/0082511 A1 | 3/2014 | Weissberg et al. |
| 2014/0115009 A1 | 4/2014 | Lashley et al. |
| 2014/0136298 A1 | 5/2014 | Marchand et al. |
| 2015/0161550 A1 | 6/2015 | Siklos et al. |
| 2015/0356137 A1 | 12/2015 | Andros |
| 2016/0070689 A1 | 3/2016 | Siklos et al. |
| 2016/0232140 A1 | 8/2016 | Ciloci |
| 2017/0351654 A1 | 12/2017 | Siklos et al. |

OTHER PUBLICATIONS

Michael Calore "How Do Native Apps and We Apps Compare?" Aug. 19, 2010, available at http://web.archive.org/web/2000819203811/ http://www.webmonkey.com/2010/08/how-do-native-apps-and-web-appscompare/.

Microsoft "Serialization (C# and Visual Basic)," Oct. 16, 2015, available at https://web.archive.org/web/20110727023109/http://msdn.microsoft.com/en-us/library/ms233843.aspx.

Document relating to U.S. Appl. No. 14/734,317 / Publication No. 2015-0356137. dated Sep. 7, 2017 (Office Action).

Document relating to U.S. Appl. No. 15/631,138 / Publication No. US 2017-0351654. dated Nov. 8, 2017 (Office Action).

Document relating to U.S. Appl. No. 14/918,170 / Publication No. 2016-0072871. dated Jan. 9, 2018 (Office Action).

Document relating to U.S. Appl. No. 15/133,482 (Publication No. 20160232140), dated Jun. 28, 2018 (Office Action).

* cited by examiner

Sales:

| Date | Items | Quantity | Price | Location |
|---|---|---|---|---|
| ... | ... | ... | ... | ... |
| 10 Feb. 10 | KITE | 5 | 60 | Chicago |
| 21 Feb. 10 | BIKE | 3 | 225 | Dallas |
| 15 Jan. 10 | SKI | 2 | 175 | Miami |
| 2 Mar. 09 | SKATE | 1 | 35 | Pittsburgh |
| ... | ... | ... | ... | ... |

210

Inventory:

| Product ID | Description | Quantity In Stock | Location |
|---|---|---|---|
| ... | ... | ... | ... |
| P1 | SKATE | 60 | Chicago |
| P2 | BIKE | 130 | Dallas |
| P3 | SKATE | 75 | Miami |
| ... | ... | ... | ... |

METHODS AND SYSTEMS FOR PROVIDING A DISCUSSION THREAD TO KEY PERFORMANCE INDICATOR INFORMATION

RELATED APPLICATIONS

This application is a continuation of application Ser. No. 14/626,042 filed on Feb. 19, 2015, which is a continuation of application Ser. No. 13/082,556 filed on Apr. 8, 2011, both of which are incorporated by reference herein in their entirety. This application also claims priority from U.S. provisional patent application No. 61/430,448, filed Jan. 6, 2011, which is incorporated by reference herein in its entirety.

TECHNICAL FIELD

The described embodiments relate generally to methods and systems for dashboard interaction.

BACKGROUND

"Dashboards" present visualizations, for example, in graph or chart form, of key performance indicator (KPI) metrics or information derived from business values or data stored in business databases. Such visualizations may be viewed (e.g., on a computer screen or other display device) by executives to obtain an overview of how a business is performing.

Different users within an organization may view a dashboard.

The applicants have recognized a need for methods and systems for providing a discussion thread to KPI information on a dashboard.

BRIEF DESCRIPTION OF THE DRAWINGS

Embodiments are described in further detail below, by way of example only, with reference to the accompanying drawings, in which.

DETAILED DESCRIPTION

When viewing a dashboard, a user may wish to comment on particular KPI values appearing on the dashboard for the benefit and/or feedback from other users. For example, a regional manager reviewing total sales for a number of stores within his region may have a question as to why a particular store is underperforming. Such a question may be asked of, and be responded to, by the store manager of the underperforming location who is also viewing the dashboard. This may result in a discussion between the two managers about the store's performance.

Although such discussion may occur using other communication channels (e.g., email), it may be desirable to perform such discussions within the immediate context of the KPI values being discussed.

The embodiments described herein allow comments to be received from multiple users so that they may be collectively displayed as a discussion thread associated with a rendered KPI value.

The embodiments described herein provide in one aspect, a system for providing a discussion thread to KPI information displayed on a dashboard. The system can include several components. There may be a renderer for rendering a dashboard displaying a KPI value corresponding to at least one business value. There may also be a comment module that is configured to receive a comment corresponding to the displayed KPI value, and generate a discussion thread comprising the comment. In some cases, the discussion thread can include a plurality of related comments.

In generating the dashboard, the system may create an intermediate table having intermediate data. The intermediate data may contain a plurality of intermediate values in which a selected intermediate value corresponds to the at least one business value that the displayed KPI value also corresponds to. As well, the intermediate data may contain a plurality of dimension categories such that each dimension category corresponds to a unique group of at least one of the plurality of intermediate values.

Of the dimension categories, there may be a selected dimension category that corresponds to the selected intermediate value. In operation, the comment module may associate the received comment and/or the resulting generated discussion thread with the selected dimension category. Furthermore, the comment module may associate the received comment and/or the resulting generated discussion thread with one or more dimension categories.

The system can further include a KPI deriver. The KPI deriver can be configured to determine the unique group of at least one intermediate value corresponding to the selected dimension category in the intermediate table. From this unique group of at least one intermediate value, the deriver may derive the displayed KPI value on the dashboard.

Additionally or alternatively, the system may include a security module operatively coupled to the comment module. The security module can be configured to authenticate the comment. When authenticating the comment, the security module may verify the comment against an authentication level of the user viewing the dashboard. In some cases, the authentication level can be associated with at least one dimension category.

Embodiments described herein may also be directed to a dashboard including the rendered KPI value and its corresponding discussion thread, as generated by the system described herein.

In another aspect, the described embodiments may be directed towards a method for providing a discussion thread to KPI information, which is displayed on a dashboard. This method may include rendering a dashboard displaying a KPI value corresponding to at least one business value. Once the dashboard is rendered, the method may involve receiving a comment corresponding to the displayed KPI value, and generating a discussion thread including the comment. In some cases, the discussion thread can include a plurality of related comments.

The discussion thread may then be further rendered in association with the KPI value.

When generating the dashboard, the method may also include the step of creating an intermediate table having intermediate data. The intermediate data may include a plurality of intermediate values in which a selected intermediate value corresponds to the at least one business value that the displayed KPI value also corresponds to. The intermediate data may also include a plurality of dimension categories in which each dimension category corresponds to a unique group of at least one intermediate value.

There may be a selected dimension category that corresponds to the selected intermediate value. In such case, the method may further include associating the selected dimension category with the received comment and/or the generated discussion thread. The method may also include associating one or more dimension categories with the received comment and/or the generated discussion thread.

Additionally or alternatively, the method may include determining the unique group of at least one intermediate value corresponding to the selected dimension category. This group of at least one intermediate value may then be used in deriving the displayed KPI value.

In further aspects, the described method may also include authenticating the comment before displaying it in a discussion thread. This authentication may involve verifying the comment against an authentication level, which may be associated with at least one dimension category.

Embodiments described herein may further be directed to a dashboard comprising the rendered KPI value and its corresponding discussion thread, as generated by the described method.

Figure 1A:
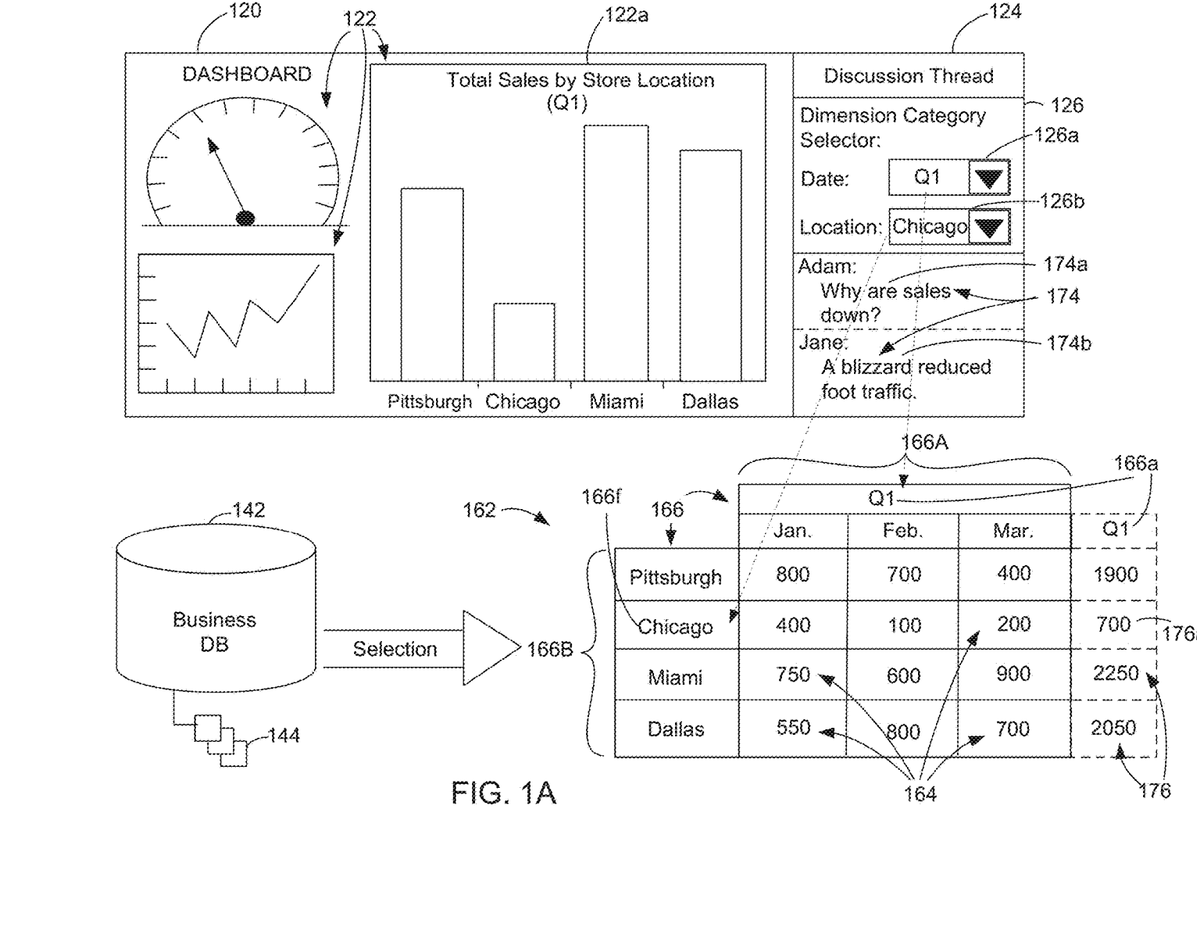
FIG. 1A is an illustration showing the overall operation of a possible configuration of providing a discussion thread to KPI information, in accordance with one embodiment of the present disclosure.

Referring to FIG. 1A, shown there is an illustration of the overall operation of providing a discussion thread to KPI information, in accordance with one embodiment of the present disclosure.

Before comments can be received, a dashboard 120 may need to be generated. In one embodiment, a dashboard 120 may be generated as follows.

First, a business database 142 storing business values 144 (e.g., sales, expenses, inventory or human resources data) may be accessed for the purpose of generating an intermediate table 162 having intermediate values 164. The intermediate values 164 may be a subset of the business values 144.

The intermediate table 162 may include dimension categories 166 that allow the intermediate values 164 to be sorted, grouped or filtered. For example, a dimension category 166 may be a particular field, property or characteristic of the intermediate values 164. As illustrated, the dimension categories 166 may be a date range 166A (e.g. 'Jan.' (January), 'Feb.' (February), 'Mar.' (March) and/or 'Q1' (i.e., the first calendar quarter)) or the various store locations 166B (e.g., 'Pittsburgh', 'Chicago', 'Miami' and 'Dallas'). As will be understood, different dimension categories may be created for different types of applications.

KPI values 176 (shown in dotted lines beside the intermediate values 164) may then be derived from the intermediate values 164 using the dimension categories 166. KPI values 176 may be a subset of the intermediate values 164 that have been consolidated by, for example, grouping, selecting or filtering the intermediate values 164 using the dimension categories 166. As illustrated, the KPI values 176 generated from the intermediate values 164 are the total sales for the time period from 'Jan.' to 'Mar.' (i.e., for the calendar quarter 'Q1' 166*a*) for each of the store locations 166B.

The KPI values 176 may then be subsequently visualized (in a graphical format) in a KPI visualization 122 in a dashboard 120. In the illustration, an exemplary KPI visualization 122*a* with the title 'Total Sales by Store Location' illustrates the KPI values 176 in a 'bar chart' graphical format. The other KPI visualizations 122 may correspond to other KPI values 176 derived from the same or other intermediate tables 162. Although the other KPI visualizations 122 are illustrated using a 'gauge' graphical format and a 'line chart' graphical format, it will be understood that other graphical formats are also possible, such as a 'pie chart' or 'data grid' graphical format.

The dashboard may typically be designed or created by several individuals in a business organization. A database administrator may first assist in selecting intermediate values 164 from the business database 142. In doing so, they may use their specialized knowledge of the layout (e.g., the schema or data types associated with particular records) of the business database 142 to select intermediate values 164 that can be used in the subsequent identification of a KPI. A business analyst may then determine the KPI that is useful for a viewer of the dashboard 120 to see. In the example illustrated in FIG. 1A, this may be the total sales by store location for a period of time. The business analyst may then further identify dimension categories 166 to process the intermediate values 164 into KPI values 176. After the KPI values 176 have been derived, a graphic designer may select a desired graphical format for depicting the KPI values 176 in the KPI visualization 122.

Once completed, the dashboard 120 may be viewed by one or more users. Comments 174 may subsequently be entered.

In the illustrated example, when viewing the KPI visualization 122 on the dashboard 120, a regional manager may have a question as to why monthly sales for the 'Chicago' 166*f* location are lower than the other store locations. To address such concern, the regional manager (in the example, 'Adam') may wish to input a comment 174 relating to this KPI value 176*a*.

To do this, 'Adam' may access a discussion thread 124 window and provide his comment 174*a* (i.e., "Why are sales down?"). When entering a comment 174, a user may be able to operate the dimension category selector 126 (illustrated generally as drop down menu boxes 126*a*, 126*b*) so that the comment 174 can be associated with one or more dimension categories 166. As illustrated, since 'Adam' wants to provide a comment 174 for total sales in the 'Q1' calendar quarter for the 'Chicago' store location, 'Adam' may select his comment 174*a* to be associated with the 'Q1' 166*a* date dimension category and the 'Chicago' 166*f* dimension category. This is shown pictorially in the illustration with dotted-line arrows pointing from the 'Date' dimension category selector 126*a* to the 'Q1' 166*a* date dimension category, and the 'Location' dimension category selector 126*b* pointing to the 'Chicago' 166*f* store location dimension category.

When the store manager for the 'Chicago' location 166*f* (in the example, 'Jane') views the dashboard 120, the comment 174*a* entered by the user 'Adam' may be visible when she is viewing the dashboard (on another computing device, in some cases). To respond, she may select the same dimension categories 166 using dimension category selector 126 (i.e., the 'Q1' 166a date range and the 'Chicago' 166f store location), and input her comment 174b (i.e., "A blizzard reduced foot traffic."). A discussion thread 124 may then be generated as a result of the inputted comments 174, in which the two managers discuss a KPI value 176 that corresponds to one or more dimension categories 166. When other users are viewing the dashboard 120 (on the same or other computing devices), they may provide additional comments 174 in the discussion thread 124 if the same dimension categories 166 are selected in the dimension category selector 126.

Figure 1B:
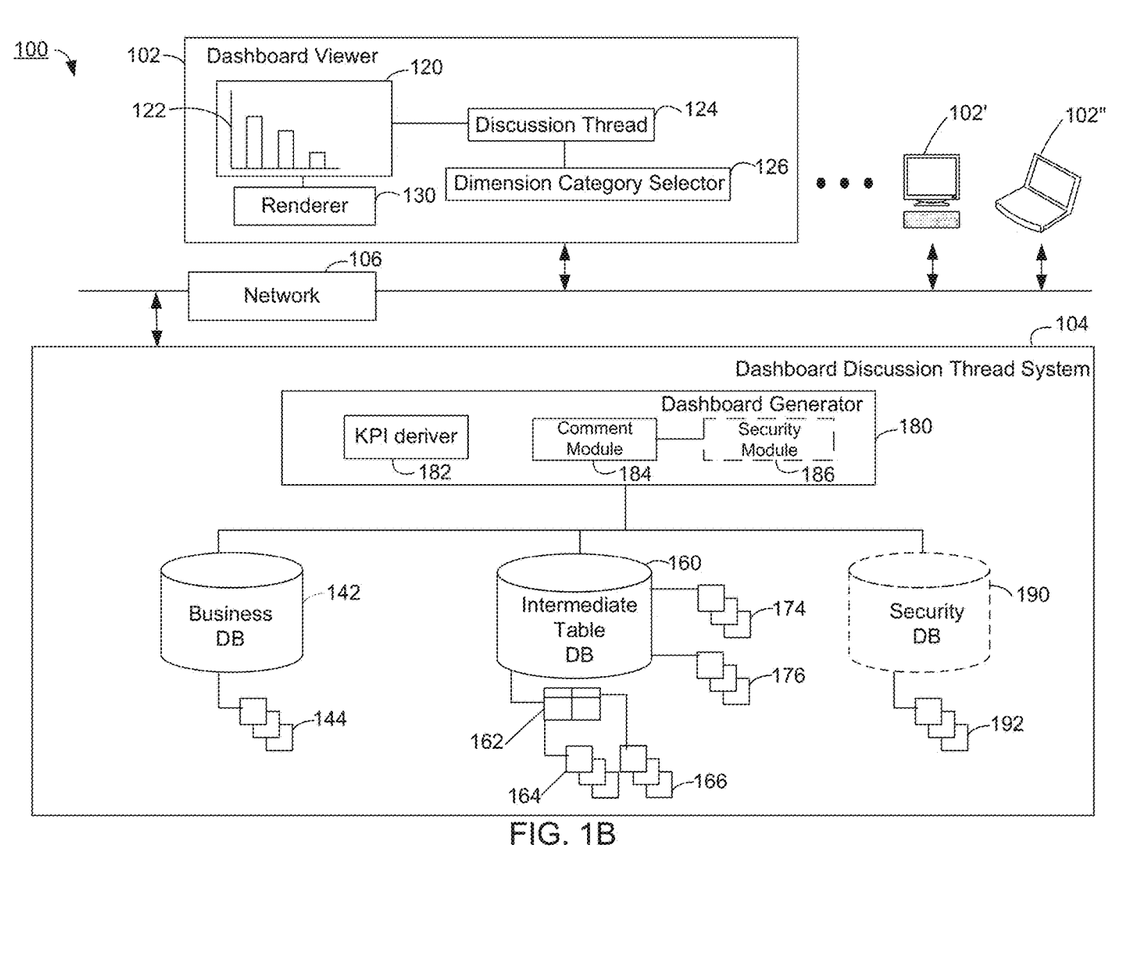
FIG. 1B is a block diagram of one possible configuration of a dashboard discussion thread system, in accordance with one embodiment of the present disclosure.

Referring to FIG. 1B, shown there generally as 100 is a block diagram of one possible configuration of a dashboard discussion thread system for implementing the high-level overview described above with respect to FIG. 1A.

The system 100 may include a dashboard viewer 102 and a dashboard discussion thread system 104, each of which may be connected to a network 106 to facilitate communication with each other. In some embodiments, the dashboard viewer 102 and dashboard discussion thread system 104 may operate in a client-server architecture according to known methods. In such operation, there may be one or more additional dashboard viewers 102', 102" (as implemented on various computing devices such as a desktop computer or a laptop, for example) that may be able to access and view a dashboard 120.

Dashboard viewer 102 may be configured to display a dashboard 120 and a discussion thread 124 generated by the dashboard discussion thread system 104. The dashboard 120 may be viewed at the dashboard viewer 102 with, for example, a web browser or a standalone application (not shown). The dashboard viewer 102 may also include the dimension category selector 126, discussed above, to allow a user to select the dimension categories 166 for associating with comments 174. Also, the dashboard viewer 102 may include a renderer 130 for rendering the dashboard 120.

Dashboard discussion thread system 104 may include the business database 142, an intermediate table database 160, and a dashboard generator 180. As discussed in greater detail below, the dashboard discussion thread system 104 may optionally (as shown in dotted outline) include a security database 190.

Figure 2:
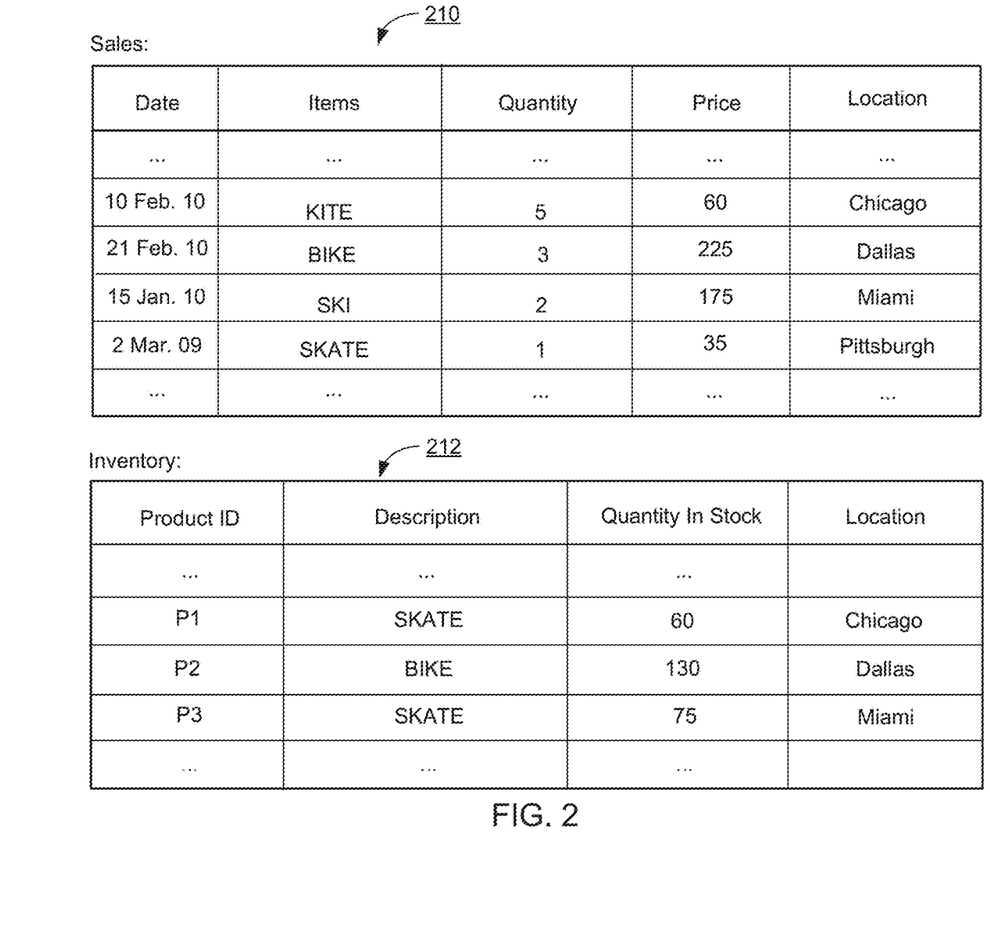
FIG. 2 shows example tables having business values that may be stored in a business database.

As noted earlier, the business database 142 may store a number of business values 144 that relate to the operation of a business. As an illustration, the business database 142 may be an accounting and inventory management database that stores transactional data for a sporting goods store having retail locations in multiple cities. Referring briefly to FIG. 2, shown there are exemplary excerpts from a 'Sales' table 210 and an 'Inventory' table 212 that may be stored in an example business database 142. In some embodiments, the business database 142 may be stored on a separate computer accessible by the dashboard discussion thread system 104.

The intermediate table database 160 may store one or more intermediate tables 162. As discussed, the intermediate table 162 may include intermediate values 164 and dimension categories 166 that may allow the grouping, sorting or filtering of the intermediate values 164.

In some embodiments, the intermediate table 162 may be a virtual table generated as a part of a database query such as a SQL query. To consolidate a potentially large volume of business values 144, the query may perform a summation or other mathematical process on the business values 144 to arrive at the intermediate values 164 forming part of the intermediate table 162.

As illustrated, the intermediate table database 160 may also store one or more comments 174 provided by viewers when they view a dashboard 120. It will be understood, however, that these comments 174 may be stored separately in another database that is accessible by dashboard discussion thread system 104.

The intermediate table database 160 may further store the KPI values 176 as derived from the intermediate values 164 (as may be derived by the KPI deriver 182, discussed below). It will be understood that while illustrated as being stored in intermediate table database 160, KPI values 176 may be stored in any other database accessible by the dashboard discussion thread system 104. Alternatively or additionally, such KPI values 176 may not be stored at all, and instead may be dynamically generated from the intermediate values 164 each time the KPI visualization 122 is displayed.

The dashboard generator 180 may include a KPI deriver 182, a comment module 184, and optionally (as shown in dotted outline), a security module 186. These modules may operate together to retrieve data from the illustrated business database 142, intermediate table database 160 (and optionally, the security database 190) to generate a dashboard 120 and any corresponding discussion thread 124.

As noted above, the KPI values 176 may be a subset of the intermediate values 164 which have been filtered, grouped or otherwise selected according to a dimension category 166.

The dimension categories 166 that may be used to process (i.e., in some cases, consolidate) the intermediate values 164 can be provided by the business analyst when they are creating a KPI. In some cases, the dimension categories 166 may be a subset or grouping of the available fields in an intermediate table 162. A business analyst may choose the dimension category 166 depending on the nature of the KPI they are desiring to create for visualization. For example, a business analyst may wish to view total sales at each store location 166B in the first calendar quarter, and may select 'Q1' 166a as the dimension category 166 for deriving the KPI values 176.

Once identified, the dimension categories 166 may be used to derive the KPI values 176. Such process may include the KPI deriver 182 being configured to determine the intermediate value 164 corresponding to the selected dimension category 166. In the example of FIG. 1A, this may involve the KPI deriver 182 identifying the sales from 'Jan.'-'Mar.' (i.e., the sales within 'Q1' 166a date range) for all the store locations 166B.

The KPI deriver 182 may then derive the KPI values 176 that are to be displayed in the KPI visualization 122 from the identified intermediate values 164. For example, this may include using the dimension categories 166 to group, sum, filter, select or otherwise process the intermediate values 164 to arrive at the KPI values 176. In the illustrated example, such derivation may include calculating the total sum for the sales from 'JAN' (January) to 'MAR' (March) for each of the store locations 166B. Additional mathematical functions that may be used to process intermediate values 164 may include average, maximum or minimum.

In some embodiments, the identified dimension categories 166 used when deriving KPI values 176 may be stored in a separate database (not shown) accessible by the KPI deriver 182.

In more complex embodiments, multiple dimension categories 166 may be identified and the derivation of KPI values 176 may be performed according to multiple dimension categories 166. For example, this may be the case if the 'Total Sales by Store Location' KPI was modified to show total sales for only the 'Chicago' 166*f* and 'Pittsburgh' locations to compare store locations in a similar geographic region. In such case, the store location dimension categories 166B may be used to filter the intermediate values 164 before they are summed into KPI values 176.

The KPI values 176 may then be transmitted to the dashboard viewer 102 so that it may be rendered by the renderer 130 on the dashboard 120. This may involve rendering the derived KPI values 176 in a desired graphical format in a KPI visualization 122 selected by the graphic designer. In the example, the KPI values 176 are rendered as a 'bar chart', but it will be understood that other suitable graphical formats may be selected. In some embodiments, the graphical format may be stored in the KPI database (not shown) along with the dimension categories 166 used to generate the KPI values 176 from the intermediate values 164.

When the dashboard 120 is viewed, a user may enter a comment 174 relating to a displayed KPI value 176 in a KPI visualization 122 (e.g., the 'Q1' 166*a* for the 'Chicago' store location 166*f*). The comment 174 entered by a user at the dashboard viewer 102 may be transmitted over the network 106.

The comment module 184 may receive this comment 174, and store it into the intermediate database 160. As discussed in further detail below, the comment module 184 may be able to associate the received comments 174 with the dimension categories 166 selected in the dimension category selector 126. The comment module 184 may be further configured to generate a discussion thread 124 containing the received comments 174.

The renderer 130 can then further render the discussion thread 124 in association with the KPI value 176 at the dashboard viewer 102. As illustrated above, the discussion thread 124 may be displayed in a dedicated window near the position of the displayed dashboard 120. In some embodiments, the discussion thread 124 may be displayed as a pop up window when the one or more KPI values 176 corresponding to the selected dimension categories 166 are highlighted on the dashboard 120. Other ways of associating the discussion thread 124 with displayed KPI values 176 may also be utilized.

Figure 3:
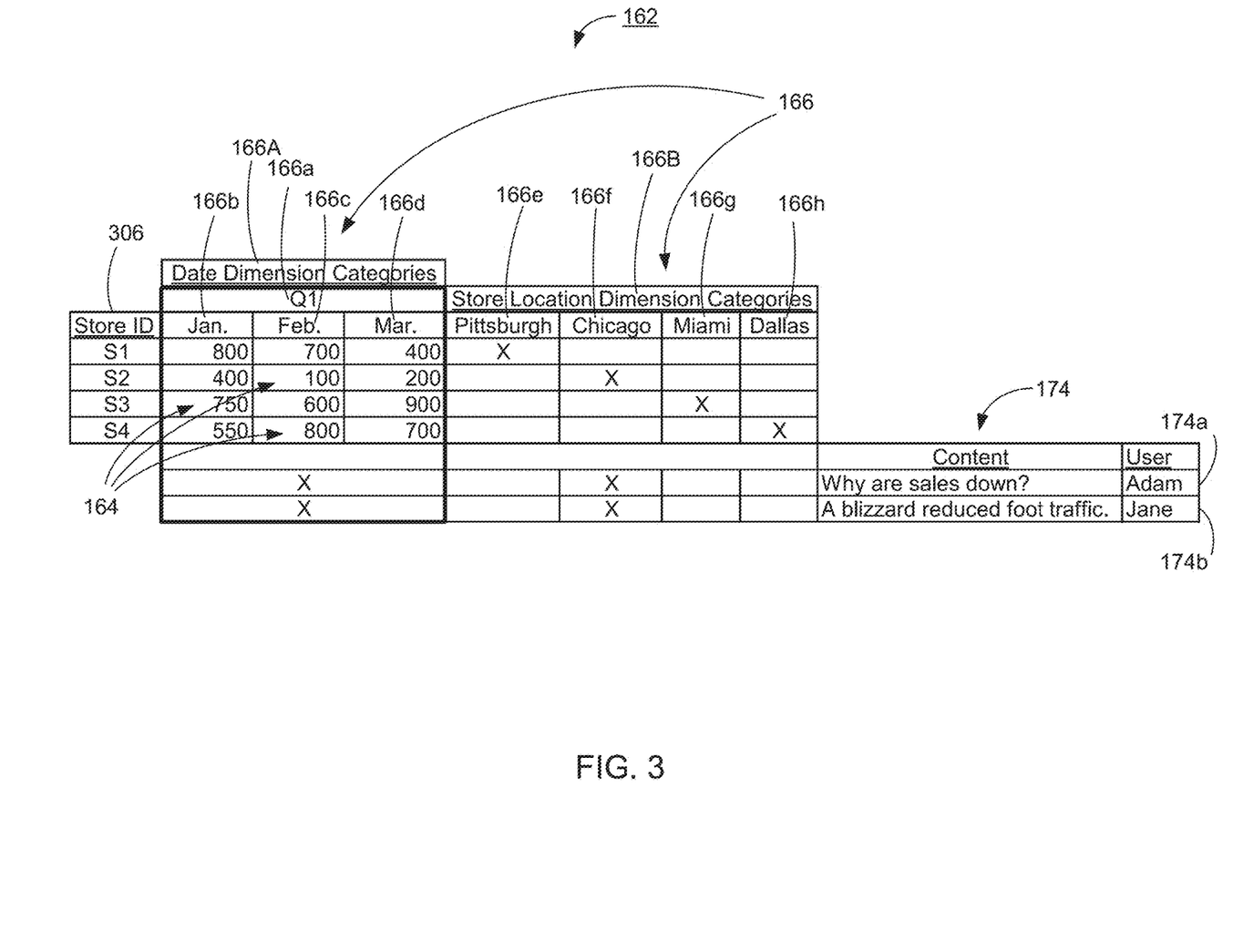
FIG. 3 is a schematic illustration of an example intermediate table having intermediate values.

Referring to FIG. 3, shown there generally as 162 is a schematic diagram with example data illustrating the various relationships amongst the intermediate table 162, intermediate values 164, dimension categories 166, and comments 174 in greater detail.

The schematic diagram 162 illustrates the intermediate values 164 containing total monthly sales for various store locations with store identifiers 306 'S1', 'S2', 'S3' and 'S4'.

The dimension categories 166 are shown in columns adjacent to, and over the intermediate values 164. As noted earlier, dimension categories 166 may be a property or characteristic of intermediate values 164 that allows filtering, sorting or grouping of intermediate values 164. As illustrated, the dimension categories 166 may be date dimension categories 166A (i.e., calendar quarter 'Q1' 166*a*, and calendar months 'Jan.' 166*b* (January), 'Feb.' 166*c* (February), or 'Mar.' 166*d* (March)) or store location dimension categories 166B (i.e., 'Pittsburgh' 166*e*, 'Chicago'166*f*, 'Miami' 166*g*, or 'Dallas' 166*h*). As will be understood, different dimension categories are also possible.

For the location dimension categories 166B, an 'X' appears in the record for which a store location is associated with the indicated dimension category 166. As illustrated, the store with store identifier 306 'S1' may be associated with the 'Pittsburgh' 166*e* store location, the store with store identifier 306 'S2' may be associated with the 'Chicago' 166*f* store location, the store with store identifier 306 'S3' may be associated with the 'Miami' 166*e* store location, and the store with product identifier 306 'S4' may be associated with the 'Dallas' store location.

For the date dimension categories 166A, since there are values in each of the records for the various date dimension categories 'Q1' 166*a*, 'Jan.' 166*b*, 'Feb' 166*c* and 'Mar.' 166*d*, the store with store identifiers 306 'S1' through 'S4' may also be associated with each of the illustrated date dimension categories.

In some embodiments, separate dimension category 166 records may be provided. These records may be stored as a part of the intermediate table database 160 discussed above, or in a separate database (not shown). In some implementations the association between intermediate values 164 and a dimension category 166 may be implemented by providing a field (containing a foreign key, for example) in the intermediate table 162 that references the record for a particular dimension category 166.

Once the associations between the dimension categories 166 and the intermediate values 164 have been established, a business analyst may be able to derive KPI values from the intermediate values 164 using the dimension categories 166, as earlier discussed. For example, a business analyst may select KPI values by filtering the intermediate values 164 to only show sales for the 'Miami' 166*g* location, or may sum up the total sales for the 'Q1' calendar quarter 166*a* for each of the store location dimension categories 166B, as discussed in FIG. 1A.

FIG. 3 also illustrates the comments 174 being associated with at least one dimension category 166. As illustrated, the comments 174 are shown on the right of the indicated store location dimension category 166B columns, and an 'X' is shown in the record for which a comment 174 is associated with the indicated dimension category 166. As illustrated, there are two comments 174*a*, 174*b* forming the discussion thread: the comment 174*a* from the user 'Adam' associated with the 'Chicago' 166*f* store location and the 'Q1' 166*a* date dimension category, and the comment 174*b* from the user 'Jane' also associated with the 'Chicago' 166*f* store location and the 'Q1' 166*a* date dimension category.

In more complex embodiments, these multiple dimension categories 166 may have various relationships. For example, each of the store location dimension categories 166B may belong to another parent dimension category related to a geographical region (e.g., a 'Region' dimension category (not shown)). In some such embodiments, the relationship may be stored as a parent-child hierarchical relationship. In such embodiments, a comment 174 associated with a 'Store Location' dimension category 166B may automatically be associated with its parent 'Region' dimension category that encompasses it. When rendering the visualization of the KPI for a particular dimension category 166, the dashboard generator 130 can be configured to determine if the particular dimension category 166 has any children dimension categories 166 so that any comments 174 for the children dimension categories 166 may also be rendered. For example, if rendering KPI values for a region dimension category 166, the comment 174 for the 'Store Location' 166B dimension category may also be rendered. In further embodiments, nested child dimension category 166 hierarchies may also be stored.

For date dimension categories 166, the relationships between different date dimension categories 166 may be automatically identified by a dashboard generator 180 as they typically do not change across different sets of intermediate values 164. For example, a 'Year' dimension category 166 may encompass a 'Quarter' dimension category 166, which may in turn encompass a 'Month' dimension category 166. In some embodiments, the hierarchy of relationships for a date dimension category 166 may be defined by known date standards such as Gregorian, Fiscal or ISO 8601 (an international standard based on week numbers).

In FIG. 3, the relationship between a 'Month' dimension category 166 and a 'Quarter' dimension category 166 is illustrated with the 'Quarter' dimension category column shown in thick outline encompassing the 'Month' dimension category 166 columns.

Additional details regarding how comments 174 are entered will now be explored in greater detail. The discussion below will refer to the general overview discussed in FIG. 1A, as well as FIGS. 4, 5A, 5B and 5C.

Figure 4:
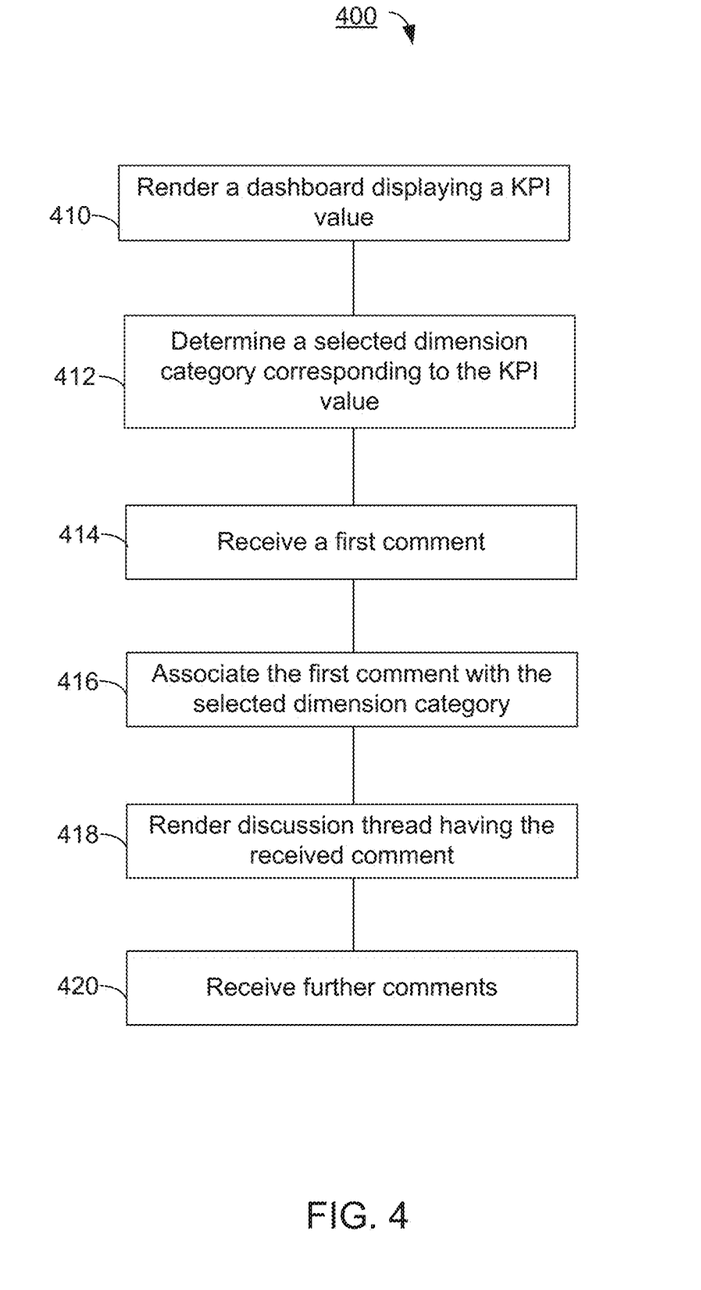
FIG. 4 is a flowchart illustrating a sequence of events for providing a discussion thread to KPI information, in accordance with an embodiment of the present disclosure.

Referring to FIG. 4, shown there is a flowchart illustrating a sequence of events for providing a discussion thread 124 to KPI information, in accordance with an embodiment of the present disclosure.

A first step may be to render the dashboard 120 (block 410). The dashboard 120 may display a KPI value 176 corresponding to at least one business value 144 stored in the business database 142. The dashboard 120 may, for example, be generated by the dashboard generator 180 and rendered by the renderer 130, as discussed above.

Figure 5A:
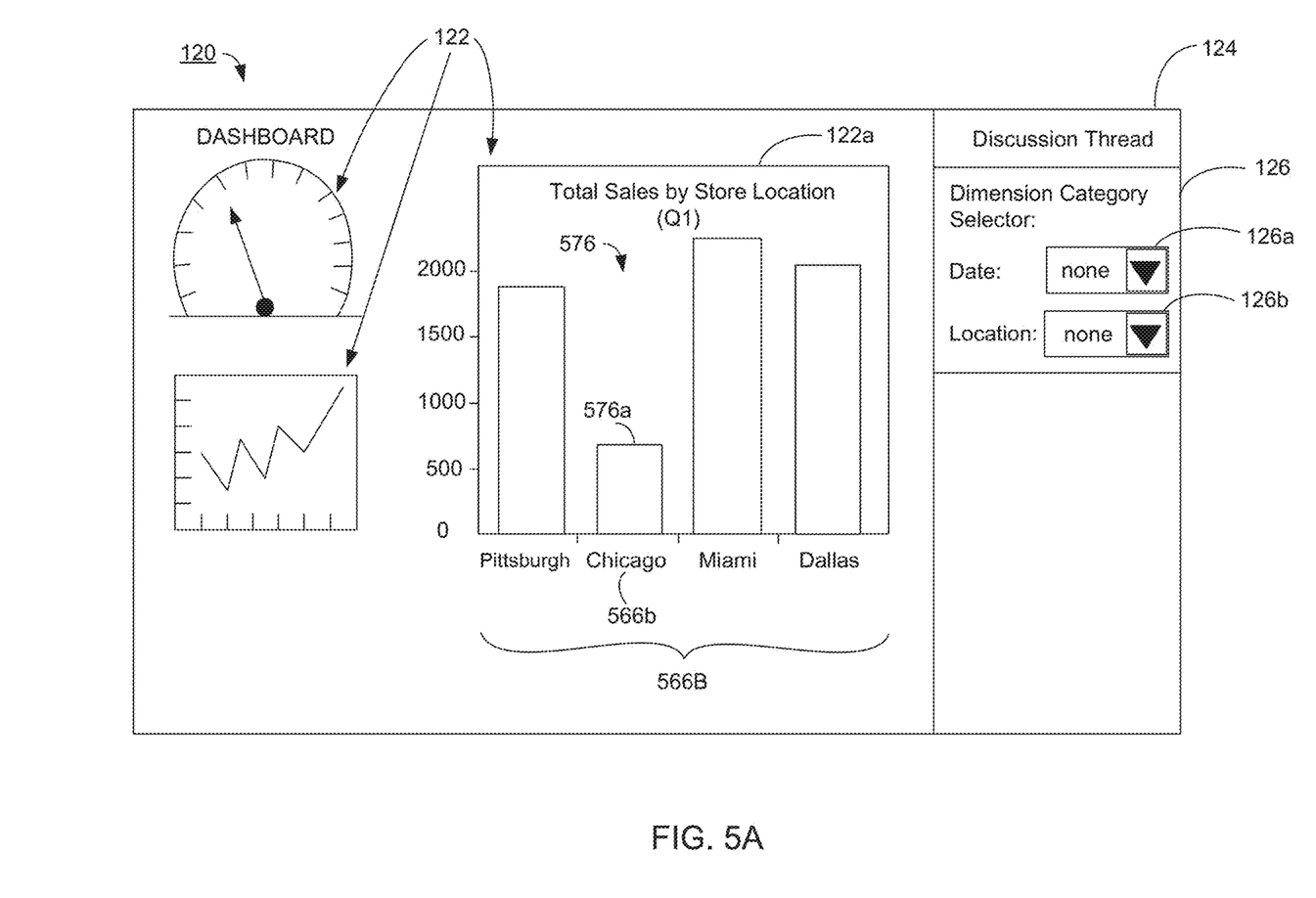
FIG. 5A is an illustration of a dashboard at a first point in time (time A) displaying a KPI visualization, prior to a comment being received.

Referring also to FIG. 5A, shown there generally is a version of the dashboard 120 displaying KPI visualizations 122 discussed in FIG. 1A at a first point in time (time A). At this time, a store manager and a regional manager may view the KPI data shown in the KPI visualization 122 in the generated dashboard 120. As illustrated, a KPI visualization 122a displays total sales for various store locations 166B in the 'Q1' 166a dimension category as derived from the intermediate values 164 in the intermediate table 162. The illustrated 'bar chart' contains store location depictions 566B in the x-axis, and the total sales (i.e., KPI value depictions 576 corresponding to KPI values 176 along the y-axis).

As illustrated, the discussion thread 124 window does not yet contain any comments 174 because none have been entered. Also, the dimension category selectors 126 (which have been illustrated, for example, as drop down menus 126a, 126b, but can be implemented as any user interface mechanism or control that allows a user to select an item) do not show any highlighted dimension categories 166.

The available dimension categories 166 that are selectable in the dimension category selector 126 may correspond to the dimension categories 166 used to derive the KPI values 176 from the intermediate values 164. For example, one selectable dimension category may be the 'Q1' 166a date range for which the total sales are displayed in the KPI visualization 122a.

Also selectable in the dimension category selector 126 are dimension categories 166 which are visible in the KPI visualization 122a or otherwise form part of the KPI values 176 being depicted. For example, the KPI values 176 include total sales for each store location 166B. In such case, each store location 166B may be identified as a dimension category 166 that can be selected in the dimension category selector 126.

After having populated the dimension category selector 126 with selectable dimension categories 166, a comment 174 may be received in the discussion thread 124 window.

Continuing on with the example discussed in FIG. 1A, the regional manager ('Adam' in our example) may have a question regarding the low sales in the KPI value depiction 576a that are illustrated for the 'Chicago' store location 566b in the KPI visualization 122a. He may then access the 'Discussion Thread' 124 window to insert a comment 174.

Figure 5B:
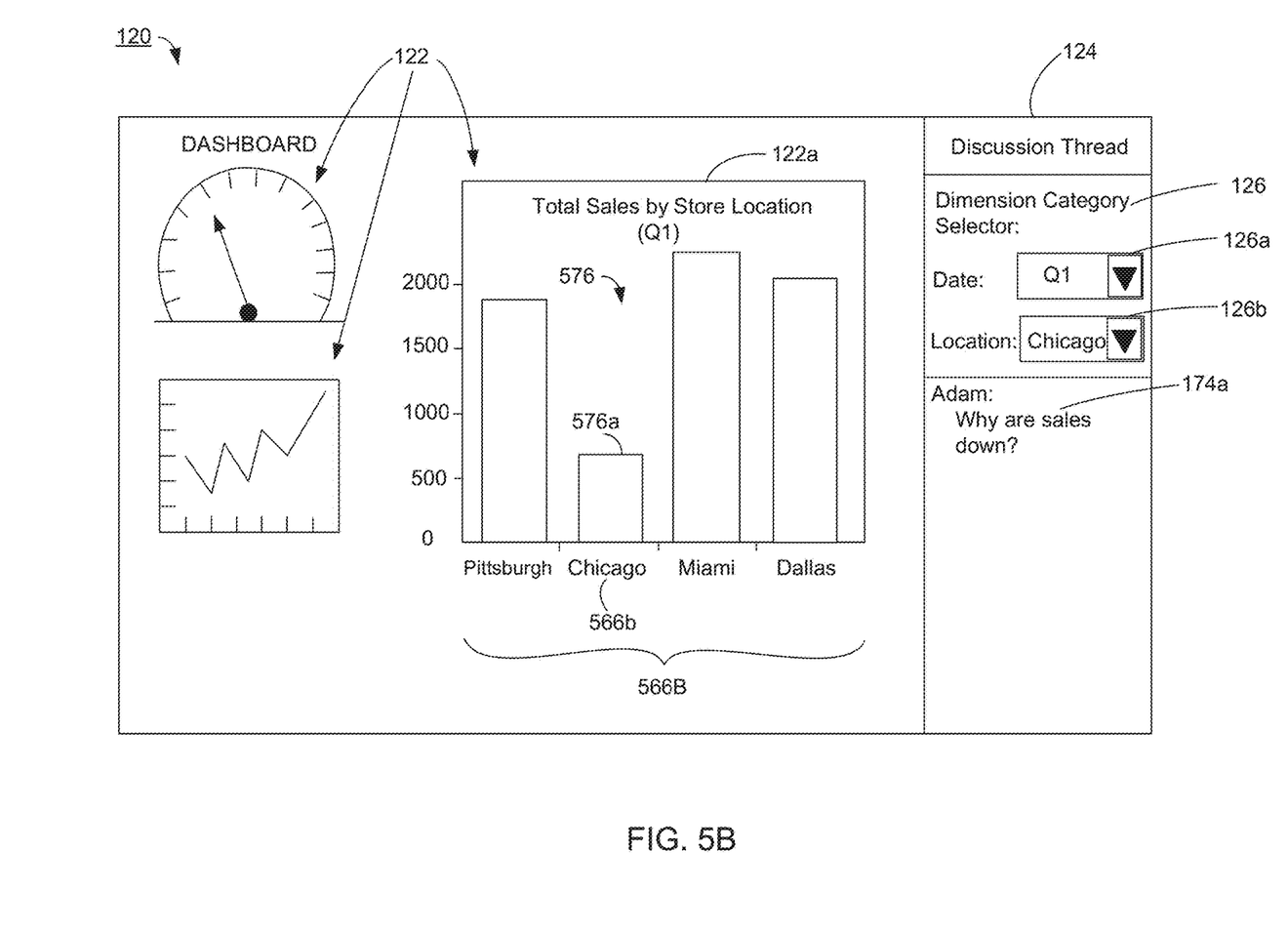
FIG. 5B is an illustration of the dashboard of FIG. 5A at a second point in time (time B), the visualization being associated with a discussion thread displaying one received comment.

Referring to FIG. 5B, shown there is an illustration at a second point in time (time B) of the dashboard of FIG. 5A, with the discussion thread 124 displaying one received comment 174a.

Before the comment 174a is entered, one or more selected dimension categories 166 corresponding to the illustrated KPI value 176a may be determined (Block 412). Particularly, the entered comment 174a may correspond the underlying KPI value 176 for a KPI value depiction 576. To facilitate such determination of the selected dimension categories 166, the user 'Adam' may operate the dimension category selector 126 to enter the dimension categories 166 corresponding to the KPI value 176a. For example, since the intended comment 174 is directed at the low sales for the first quarter ('Q1' 166a) at the 'Chicago' store location 166f, the dimension categories 'Q1' 166a and 'Chicago' 166f may be selected in the drop down boxes 126a and 126b in the dimension category selector 126. Once the dimension categories 166 have been selected in the dimension category selector 126, the comment 174a may be entered.

To receive such comment 174a, the discussion thread 124 window may provide a separate text entry area for allowing the text comment 174 to be entered. In some embodiments, this may be a popup text window, although it will be understood that other suitable text entry methods may also be possible. It will also be understood that other comments 174 beside text comments (e.g., rich text, HTML markup, embedded video or audio, an image, a file attachment or a hyperlink to other relevant information internal or external to the dashboard 120) may also be entered. A comment 174 may also be associated with other pieces of information, such as the date and time the comment was created and/or last modified. Such date and time may be displayed as part of, or in conjunction with, the comment 174.

In more complex embodiments, the manual selection of dimension categories 166 in the dimension category selector 126 can be avoided. In such case, the dimension categories 166 associated with the comment 174 may be automatically selected based on the highlighting, clicking or selection of an area on the KPI visualization 122 corresponding to the KPI value 176a. For example, the dashboard 120 may be provided with a 'Discussion' mode in which, the selection of KPI value depictions 576 on the KPI visualization 122 provides an option for the entry of comments 174 with respect to the dimension categories 166 associated with the KPI value 176 underlying the selected KPI value depiction 576. In the example, the dimension categories 166 may be implicitly selected when a user 'Adam' selects the vertical bar KPI value depiction 576a in the bar chart corresponding to the total sales for the 'Chicago' store location 166f for the calendar quarter ('Q1' 166a). In such scenario, the KPI visualization 122 may be configured to identify the KPI values 176 it is illustrating such that when the KPI value depiction 576a corresponding to the KPI values 176 is selected, the KPI visualization 122 can communicate the dimension categories 166 associated with the KPI value 176 to the dimension category selector 126.

In the example, this would mean that the KPI visualization 122 may be operable to communicate to the dimension category selector 126 that the selected KPI value depiction 576a corresponds to the 'Chicago' 166f dimension category and the 'Q1' 166a dimension category. Accordingly, any comment 174 entered would be associated with these selected dimension categories 166, and a dimension category selector 126 may not be explicitly operated by the viewer of a dashboard 120.

After the dimension categories 166 are selected in the dimension category selector 126, 'Adam' may enter his comment 174*a* (i.e., "Why are sales down?") so that it is received by the dashboard discussion thread system 104 (Block 414). The entered comment 174*a* may subsequently be associated with the dimension categories 166 selected in the dimension category selector 126 (Block 416).

Once entered, the comment module 184 may be configured to generate the discussion thread 124 including the comment 174*a*. This discussion thread 124 may be further rendered in association with the depicted KPI value 176*a* (block 418) such as is illustrated in FIG. 5B. As noted earlier, while the discussion thread 124 is illustrated as a separate window beside the dashboard 120, the discussion thread 124 may also be rendered next to the KPI value depiction 576 that it relates to. For example, such depiction may be in the form of depicting an indicator (a tool tip, small icon or graphic, for example) near the KPI value depiction 576 such that if accessed (e.g., clicked on or hovered over with a mouse pointer, finger, stylus or other pointing device), the discussion thread 124 may be depicted.

To respond to the comment 174*a* left by the user 'Adam', the store manager 'Jane' for the 'Chicago' 166*f* store location may wish to enter her own comment 174 to address the regional manager's question regarding store performance.

Figure 5C:
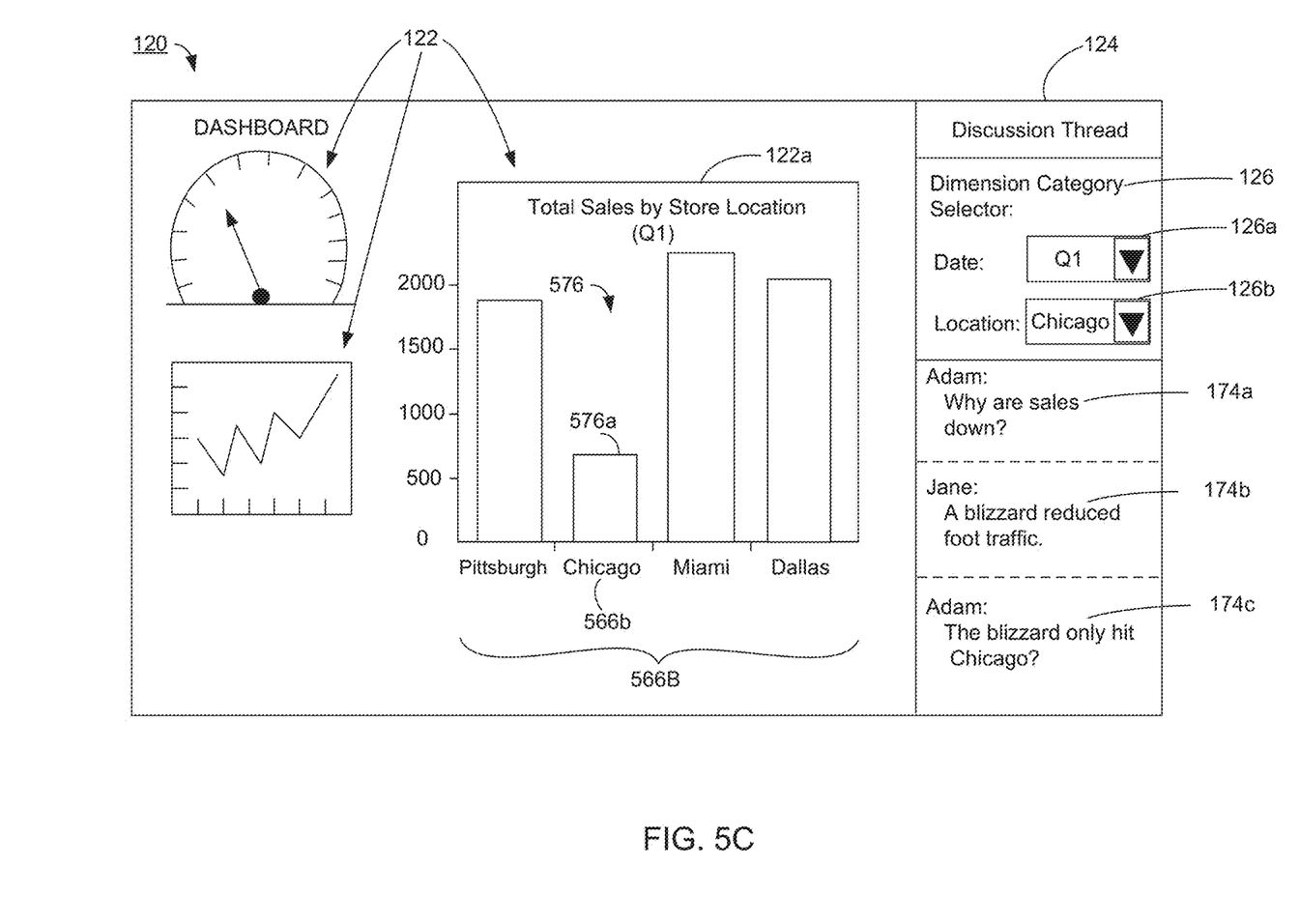
FIG. 5C is an illustration of the dashboard of FIG. 5B at a third point in time (time C), the visualization being associated with a discussion thread displaying multiple received comments.

Referring to FIG. 5C, shown there is an illustration at a third point in time (time C) of the dashboard 120 in FIGS. 5A and 5B after additional comments 174 have been received. As illustrated, the user 'Jane' has added her response comment 174*b* ("A blizzard reduced foot traffic") to the first comment 174*a* from 'Adam'. FIG. 5C also shows a follow up comment 174*c* from 'Adam' asking "The blizzard only hit Chicago?"

The process of receiving additional comments 174 (block 420) may be similar to what is described above when entering the first comment 174. That is, if the same dimension categories 166 are selected in the dimension category selector 126 as when entering the first comment 174, the additional comments 174 may be added to the same discussion thread 124.

Since the various comments 174 making up the discussion thread 172 can be associated with the selected dimension categories 166 identified in the dimension category selector 126 (i.e., the 'Q1' 166*a* date range and the 'Chicago' 166*f* store location), the entirety of the discussion thread 124 can also be considered to be associated with the selected dimension categories 166. Consequently, if other dimension categories 166 are subsequently selected in the dimension category selector 126, the discussion thread 124 may not be visible, and other comments 174 associated with the other selected dimension categories 166 may be displayed.

While FIG. 5C illustrates a discussion thread 124 as having discussion comments 174 entered by two users, it will be understood that comments 174 may be entered by just one or a number of other users.

As illustrated, the discussion thread 124 may display comments 174 in chronological order (i.e., a newly received comment 174 is displayed after the most recently received comment 174). However, it will be understood that in some embodiments, the comment module 184 may be configured to receive (and the renderer 130 may be configured to render) nested hierarchical comments. That is, when adding a comment 174 to a discussion thread 124, the comment 174 may not necessarily respond to the last entered comment 174. Instead, the user may be presented with an option to respond directly to any one of the displayed comments 174.

For example, for the dashboard 120 shown in FIG. 5C, the user 'Jane' may be able to enter another comment 174 in further response to the initial question 174*a* ("Why are sales down?") posed by the user 'Adam'. This comment may, for example be "Also, a competing store opened next door". Since such comment 174 may be in direct response to the first comment 174*a*, the additional comment 174 may be displayed as being associated with the initial comment 174*a* (e.g., displayed directly below the initial comment and further indented from the edge of the discussion thread 124 window). This may result in discussion thread 124 not appearing in chronological order. In more complex embodiments, further comments 174 in response to other responding comments 174 may result in nested comment hierarchies that are many levels deep.

As can be seen, the discussion thread 124 may allow different users to discuss KPI values 176 that they see on a dashboard 120. While the discussion thread 124 may be associated with selected dimension categories 166, there may be scenarios when it is desirable to limit the type of users who may access, view, enter or modify (edit) comments 174. For example, if a comment 174 contains confidential information, the comment may only be viewed by users with the proper access privileges.

The operation of the optional security module 186 and security database 190 shown in FIG. 1B will now be discussed.

The security module 186 may be connected to the comment module 184 so that when a comment 174 is accessed (e.g., if the renderer 130 is rendering a discussion thread 124), the comment module 184 may prevent access to the comment 174 for which an accessing user does not have appropriate privileges. In such way, the security module 186 can be thought of as authenticating the comment 174 before the comment 174 is accessed in the discussion thread 172.

In some embodiments, the privileges of the viewer of the dashboard 120 may be associated with an authentication level 192 (i.e., a security level or user group that specifies access (e.g., read/write/delete) privileges). Comments 174 may similarly be associated with an authentication level 192. Before the comment 174 is allowed to be accessed, the security module 186 may first verify that the viewer has the same or a higher authentication level 192 than the comment 174 that is to be accessed.

For example, if a viewer belongs to a marketing team, comments 174 may be configured to have an authentication level such that the comment 174 is only authenticated (i.e., allowed to be accessed) when viewed by members who have the same authentication level (i.e., are a part of the marketing team). If a viewer does not have the same (or a higher) authentication level, the comment 174 is not authenticated, and the comment 174 is prevented from being accessed. In some embodiments, the discussion thread 124 itself may also be associated with an authentication level such that a comment 174 may not be entered if the user does not meet or exceed the authentication level of discussion thread 124.

In further embodiments, an authentication level can be associated with a particular KPI. In such case, a comment 174 may not be visible when the same data point is displayed in a different KPI. Such feature may be useful, for example, when the same data point appears in multiple KPIs. Further, the discussion thread 124 window may be configured to provide an option for the user to filter the display of comments 174 on a per-KPI basis (e.g., via a dropdown menu containing a list of available KPIs). In some such embodiments, comments 174 associated with multiple KPIs may be displayed in the same discussion thread 124 window if multiple KPIs are selected to be viewed.

Additionally or alternatively, an authentication level may be associated with a project (a product launch or marketing campaign, for example) that users of a dashboard may be participating in such that individuals not participating in the project would not be able to access the comments 174. The project may give rise to a particular dashboarding endeavor such that the data associated with generating the dashboard (e.g., an intermediate table 162) may be associated with one or more authentication levels associated with the project. Comments 174 associated with such dashboard may, in turn, also be associated with the same one or more authentication levels.

Moreover, in some embodiments, there may be an authentication level that restricts the accessing of comments 174 only to those who originally entered the comment 174. Such comments 174 may be considered 'private' to the user who entered them.

In other embodiments, the authentication level may be associated with the dimension category 166 corresponding to the discussion thread 124. For example, in the earlier example for comments 174 related to the 'Chicago' 166*f* store location's store performance, such discussion thread 124 may be limited to viewers belonging to an authentication level that is allowed to view information related to the 'Chicago' 166*f* store location. That is, a store manager for another store location may not be able to view the comments 174 that have been entered related to the 'Chicago' 166*f* store location.

Furthermore, in some embodiments, comments 174 may be associated with a 'comment group' (i.e., a virtual container for comments 174 and/or discussion threads 124) which one or more comments 174 and/or the discussion thread 124 may be associated with. In such embodiments, an authentication level may be additionally or alternatively associated with the comment group so that access to comments 174 within the comment group can be based on the authentication level for the 'comment group' instead of on a per comment 174/discussion thread 124 basis. Using a comment group to configure the authentication level may allow for greater efficiency when providing for the security of received comments 174 in that multiple comments 174 and/or their associated discussion threads 124 may have their security configured via the comment group instead of on an individual basis. The authentication levels for a comment group can be configured to correspond to any one or more of the discussed entities, such as a KPI, a project, a team, a dimension category, and/or user group privileges/permissions.

Referring again to FIG. 3, an additional or alternative embodiment for implementing date dimension categories 166A will now be explored.

To facilitate the determination of whether a comment 174 should be displayed in a visualization of a KPI, the comment 174 may store a date range (not shown) for which the comment 174 should be displayed. For example, for the comment 172*a* associated with the 'Q1' 166*a* date dimension category, the date range 310 may be stored as 'Jan. 1-Mar. 31'. The limits of the date range may be defined arbitrarily, without dependency on, or reference to, available date dimension categories or intermediate values.

To determine if a comment 174 should be displayed, the dashboard generator 180 may be configured to determine if a date intermediate value 164 corresponding to the date dimension category 166 being visualized corresponds to the date range for the comment 174. In other words, the dashboard generator 180 may be configured to determine if the date range of a comment 174 falls within the range for the date dimension categories 166 being visualized in the KPI. If so, the comment 174 may be displayed; if not, the comment 174 should not be displayed.

Consider, for example, a KPI visualization that shows 'Sales by Months' for the first calendar quarter (i.e., the 'Q1' 166*a* dimension category having a date range of 'Jan. 1-Mar. 31'). If a comment 174 is associated with the 'Jan' 166*b* and 'Feb' 166*c* date dimension categories such that it stores a date range of 'Jan. 15-Feb. 15', for example, such comment 174 would be viewable on the dashboard 120 because the 'Jan 15-Feb. 15' date range would fall within the 'Q1' date range (Jan. 1-Mar. 31). That is, the intermediate values 164 being displayed for the date range of the dimension category 166 would correspond to the date range of the comment 174.

It will be understood by persons skilled in the art that variations are possible in variant implementations and embodiments of the described dashboard creation system 100. Such variations include, but are not limited to, variations in the connectivity amongst described components, the sequence of execution by the described components, the organization of described components, as well as the data structures and types of data stored. Further, while the above embodiments have been described with respect to KPI information, it will be understood that the described methods and systems may also be used to provide comments and/or a discussion thread to any type of intermediate data having dimension categories generated from business values.

The steps of a method in accordance with any of the embodiments described herein may be provided as executable software instructions stored on computer-readable media, which may include transmission-type media. Such steps may not be required to be performed in any particular order, whether or not such steps are described in claims or otherwise in numbered or lettered paragraphs.

The invention has been described with regard to a number of embodiments. However, it will be understood by persons skilled in the art that other variants and modifications may be made without departing from the scope of the invention as defined in the claims appended hereto.

The invention claimed is:

1. A system for providing a discussion thread to key performance indicator information visualized in a dashboard displayed on a remote computing device, the dashboard comprising a discussion thread window, the system comprising:
   a processor;
   a business database storing a plurality of business values;
   an intermediate table database storing one or more intermediate tables, wherein the one or more intermediate tables comprise:
      a plurality of intermediate values comprising a subset of the plurality of business values,
      a plurality of date dimension categories, and
      a plurality of dimension categories, each dimension category corresponding to a unique group of at least one of the plurality of intermediate values; and
   a dashboard generator configured to:
      derive one or more key performance indicator values from the plurality of intermediate values using at least one of the plurality of date dimension categories and at least one of the plurality of dimension categories, transmit the derived one or more key performance indicator values to the remote computing device for visualization in the dashboard,
receive a comment from the remote computing device via the discussion thread window displayed on the remote computing device, the discussion thread window comprising a dimension category selector for receiving a selection of at least one of the plurality of dimension categories and a date dimension category selector for receiving a selection of at least one of the plurality of date dimension categories,
store the comment in association with:
a selected at least one of the plurality of dimension categories,
a date range comprising a selected at least one of the plurality of date dimension categories, and
an authentication level; and
transmit at least one additional comment to the remote computing device for display in the discussion thread window, the at least one additional comment having a stored association with the selected at least one of the plurality of dimension categories and the selected date range.

2. The system of claim 1, wherein at least some of the plurality of dimension categories are stored as a parent-child hierarchical relationship.

3. The system of claim 1, wherein the authentication level is based on an identification of a user of the remote computing device.

4. The system of claim 1, wherein the dashboard generator is further configured to store the comment in association with a comment group, and wherein the authentication level stored in association with the comment is based on the comment group.

5. The system of claim 1, wherein the plurality of date dimension categories is based on a Gregorian, Fiscal, or ISO 8601 calendar system.

6. A method for providing a discussion thread to key performance indicator information visualized in a dashboard displayed on a computing device, the method comprising:
retrieving a plurality of business values from one or more business databases;
deriving a plurality of intermediate values comprising a subset of the plurality of business values;
deriving one or more key performance indicator values from the plurality of intermediate values using at least one date dimension category and at least two dimension categories stored as a parent-child hierarchical relationship, each of the at least two dimension categories corresponding to a unique group of at least one of the plurality of intermediate values;
rendering a dashboard on a display of the computing device, the dashboard comprising a display of at least one of the one or more key performance indicator values;
rendering a discussion thread window on the display of the computing device, the discussion thread window comprising:
a dimension category selector for receiving a selection of at least one dimension category,
a date dimension category selector for receiving a selection of at least one date dimension category, and
a discussion thread comprising at least one comment stored in association with:
a date dimension category that falls within a date range of the at least one of the one or more key performance indicator values displayed on the rendered dashboard, and
a dimension category that corresponds to a dimension category or a parent dimension category of the at least one of the one or more key performance indicator values displayed on the rendered dashboard,
receiving and storing an additional comment in association with:
a date range comprising a selected at least one of the plurality of date dimension categories; and
a selected at least one dimension category.

7. The method of claim 6, wherein the receiving and storing an additional comment further comprises storing the additional comment in association with an authentication level.

8. The method of claim 6, wherein the discussion thread is associated with an authentication level.

9. The method of claim 6, wherein the at least one date dimension category is based on a Gregorian, Fiscal, or ISO 8601 calendar system.

10. A method for providing a discussion thread to key performance indicator information visualized in a dashboard displayed on a computing device, the method comprising:
rendering a dashboard on a display of the computing device, the dashboard comprising a visualization of at least one key performance indicator value
rendering a discussion thread window on the display of the computing device, the discussion thread window comprising:
a dimension category selector for receiving a selection of at least one dimension category,
a date dimension category selector for receiving a selection of at least one date dimension category, and
a discussion thread comprising at least one comment stored in association with:
a date dimension category that falls within a date range of the visualized at least one key performance indicator value, and
a dimension category that corresponds to a dimension category associated with the visualized at least one key performance indicator value or to a dimension category stored as a parent in a parent-child hierarchical relationship with a dimension category associated with the visualized at least one key performance indicator value,
receiving an additional comment in association with:
a date range comprising a selected at least one of the plurality of date dimension categories; and
a selected at least one dimension category; and
updating the rendered discussion thread window to display the additional comment.

11. The method of claim 10, wherein receiving the additional comment further comprises storing the additional comment in association with an authentication level.

12. The method of claim 11, wherein updating the rendered discussion thread window to display the additional comment further comprises:
comparing the authentication level stored in association with the additional comment with an authentication level stored in association with a user of the computing device, and
in response to determining that the authentication level stored in association with the user is the same or higher than the authentication level stored in association with the additional comment, permitting display of the additional comment, and in response to determining that the authentication level stored in association with the additional comment is higher than the authentication level stored in association with the user, preventing display of the additional comment.

13. The method of claim 10, wherein the discussion thread is associated with an authentication level.

* * * * *